(12) United States Patent
Watanabe et al.

(10) Patent No.: US 8,318,305 B2
(45) Date of Patent: Nov. 27, 2012

(54) RESIN COMPOSITION

(75) Inventors: Kenji Watanabe, Ichihara (JP); Kenji Atarashi, Kimitsu (JP); Kumiko Chatani, Ibaraki (JP); Motoomi Arakawa, Gotenba (JP)

(73) Assignees: Sumitomo Chemical Company, Limited, Tokyo (JP); Teijin Fibers Limited, Osaka (JP)

( * ) Notice: Subject to any disclaimer, the term of this patent is extended or adjusted under 35 U.S.C. 154(b) by 0 days.

(21) Appl. No.: 13/115,605

(22) Filed: May 25, 2011

(65) Prior Publication Data

US 2011/0293913 A1 Dec. 1, 2011

(30) Foreign Application Priority Data

May 28, 2010 (JP) ................................ 2010-122621

(51) Int. Cl.
- B32B 27/04 (2006.01)
- B32B 27/00 (2006.01)
- C08F 8/00 (2006.01)
- C08F 242/00 (2006.01)

(52) U.S. Cl. ..................... 428/394; 428/375; 428/297.4; 525/130; 525/190

(58) Field of Classification Search ........................ None
See application file for complete search history.

(56) References Cited

U.S. PATENT DOCUMENTS

| 4,820,775 | A | 4/1989 | Shiga et al. |
| 2002/0161131 | A1 | 10/2002 | Kitano et al. |
| 2010/0029855 | A1 | 2/2010 | Matsuoka et al. |
| 2011/0136951 | A1* | 6/2011 | Kitano et al. .................. 524/109 |

FOREIGN PATENT DOCUMENTS

| EP | 2236547 A1 | 10/2010 |
| JP | 61-287917 A | 12/1986 |
| JP | 03-121146 A | 5/1991 |
| JP | 03-272830 A | 12/1991 |
| JP | 4-323207 A | 11/1992 |
| JP | 2002005924 A | 1/2002 |
| JP | 2002-308947 A | 10/2002 |
| JP | 2004-217753 A | 8/2004 |
| JP | 2004-217754 A | 8/2004 |
| JP | 2004-292581 A | 10/2004 |
| JP | 2009-292861 A | 12/2009 |
| WO | 2008081791 A1 | 7/2008 |
| WO | 2009093748 A1 | 7/2009 |
| WO | WO2009093748 | * 7/2009 |

OTHER PUBLICATIONS

Ide, "Practical Polymer Alloy Design," Institute of Industrial Research (1996), p. 29, line 10 to p. 30, line 18, (English translation of pertinent portion).

Moad, "The synthesis of polyolefin graft copolymers by reactive extrusion," Progress in Polymer Science, vol. 24, pp. 81-142 (1999).

"New Edition of Polymer Analysis Handbook," edited by the Polymer Analysis Research Committee of the Chemical Society of Japan and published by KinoKuniya Shoten, (1995) (English translation of pertinent portion).

"New Polymer Production Process," edited by Yasuji Saeki, Published by the Institute of Industrial Research (1994) (English translation of pertinent portion).

Zambelli et al, "Communications to the Editor," Macromolecules, vol. 6, No. 6, pp. 925-926 (Dec. 1973).

Zambelli et al, "Communications to the Editor," Macromolecules, vol. 8, No. 5, pp. 687-689 (Sep. to Oct. 1975).

* cited by examiner

*Primary Examiner* — Camie Thompson
(74) *Attorney, Agent, or Firm* — Panitch Schwarze Belisario & Nadel LLP

(57) ABSTRACT

A resin composition comprising a fiber component and a resin component, wherein
the fiber component is (A) a surface-treated fiber (component A) which comprises 100 parts by weight of a fiber comprising a polyalkylene terephthalate and/or a polyalkylene naphthalene dicarboxylate (component Af) and 0.1 to 10 parts by weight of a sizing agent having a glass transition point of −80° C. or higher and lower than 70° C. and adhered to the surface of the fiber (component Ac); and
the resin component comprises (B) an ethylene-based copolymer containing a glycidyl group (component B), (C) a modified polyolefin resin modified with an unsaturated carboxylic acid and/or an unsaturated carboxylic acid derivative (component C), and (D) a polyolefin resin having a melt flow rate of 40 to 200 g/10 min (component D), except for the components C and D, the content of the component D being 30 to 850 parts by weight based on 100 parts by weight of the component A, and the total content of the components B and C being 5 to 630 parts by weight based on 100 parts by weight of the component A,
and a molded article thereof.

6 Claims, No Drawings

RESIN COMPOSITION

FIELD OF THE INVENTION

The present invention relates to a resin composition comprising a fiber component and a resin component.

DESCRIPTION OF THE PRIOR ART

Heretofore, a large number of molding materials comprising a filler and a fiber have been proposed as means of improving the mechanical strength such as tensile strength and stiffness of a polyolefin resin.

In recent years, it has been strongly desired to reduce the weights of parts. As one of measures for meeting this, it is proposed to improve the tensile strength and mechanical strength such as stiffness and surface hardness of a polyolefin resin by mixing various fibers. It is widely known that adhesion between a fiber and a resin plays an important role in the development of the performance of a fiber-reinforced resin.

For example, Patent Document 1 discloses a resin composition which comprises a polyolefin, a modified polyolefin and a reinforcement fiber and teaches that it is important to improve adhesion between the fiber and the resin in order to improve the mechanical strength of the resin composition.

Patent Document 2 discloses a resin composition which comprises a matrix polymer, a modified polymer and an organic polymer fiber. Patent Document 2 teaches a method of adding a modifier to a resin and a method of introducing a reactive functional group onto the surface of the fiber as means of improving adhesion between the fiber and the resin.

Patent Document 3 discloses a resin composition which comprises a polyalkylene naphthalene dicarboxylate fiber to the surface of which a sizing agent is adhered and a polyolefin resin modified with an unsaturated carboxylic acid or the like.
(Patent Document 1) JP-A 3-121146
(Patent Document 2) JP-A 2009-292861
(Patent Document 3) WO2009/093748

SUMMARY OF THE INVENTION

It is an object of the present invention to provide a resin composition which comprises a fiber and a polyolefin resin and provides a lightweight molded article having excellent impact resistance.

That is, the present invention is a resin composition comprising a fiber component ad a resin component, wherein
the fiber component is (A) a surface-treated fiber (component A) which comprises 100 parts by weight of a fiber comprising a polyalkylene terephthalate and/or a polyalkylene naphthalene dicarboxylate (component Af) and 0.1 to 10 parts by weight of a sizing agent (component Ac) having a glass transition point of −80° C. or higher and lower than 70° C. and adhered to the surface of the fiber; and
the resin component comprises
(B) an ethylene-based copolymer containing a glycidyl group (component B),
(C) a modified polyolefin resin modified with an unsaturated carboxylic acid and/or an unsaturated carboxylic acid derivative (component C), and
(D) a polyolefin resin having a melt flow rate of 40 to 200 g/10 min (component D), except for the components B and C, the content of the component D being 30 to 850 parts by weight based on 100 parts by weight of the component A, and the total content of the components B and C being 5 to 630 parts by weight based on 100 parts by weight of the component A.

DETAILED DESCRIPTION OF THE PREFERRED EMBODIMENT

<Fiber Component>
The fiber component in the present invention is a surface-treated fiber (component A) obtained by adhering the sizing agent (component Ac) to the surface of the fiber (component Af).
(Fiber: Component Af)
The fiber (component Af) comprises a polyalkylene terephthalate and/or a polyalkylene naphthalene dicarboxylate. Preferably, the fiber (component Af) comprises a polyalkylene naphthalene dicarboxylate.
(Polyalkylene Naphthalene Dicarboxylate)
The polyalkylene naphthalene dicarboxylate is preferably a polycondensation product of an alkylene diol and naphthalene dicarboxylic acid, preferably a polyester comprising an alkylene naphthalene dicarboxylate unit represented by the following formula (1) or (2) in an amount of not less than 80 mol of the total of all the recurring units. The content of the alkylene naphthalene dicarboxylate unit is preferably not less than 90 mol %, more preferably not less than 95 mol %, much more preferably 96 to 100 mol % of the total of all the recurring units. In the formula (1) or (2), "n" is an integer of 2 to 4.

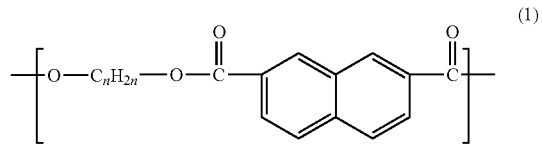

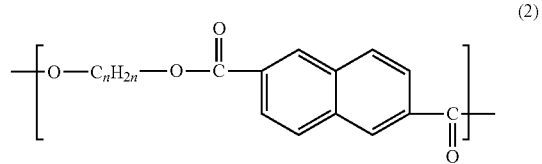

The alkylene group (—$C_nH_{2n}$—) forming the main chain of the alkylene naphthalene dicarboxylate is preferably an alkylene group having 2 to 4 carbon atoms. Examples of the alkylene group include ethylene group, trimethylene group and tetramethylene group. The polyalkylene naphthalene dicarboxylate is preferably polyethylene naphthalene dicarboxylate, more preferably polyethylene-2,6-naphthalene dicarboxylate.
(Polyalkylene Terephthalate)
The polyalkylene terephthalate is a condensation polymer of an alkylene diol and terephthalic acid, preferably a polyester comprising an alkylene-terephthalate unit represented by the following formula (3) in an amount of not less than 80 mol % of the total of all the recurring units. The content of the alkylene terephthalate unit is preferably not less than 90 mol %, more preferably not less than 95 mol %, much more preferably 96 to 100 mol % of the total of all the recurring units. In the formula (3), "n" is an integer of 2 to 4.

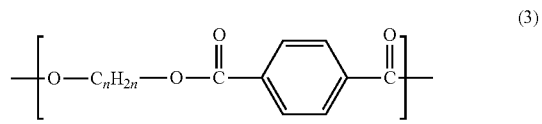

The alkylene group (—$C_nH_{2n}$—) forming the main chain of the alkylene terephthalate is preferably an alkylene group having 2 to 4 carbon atoms. Examples of the alkylene group include ethylene group, trimethylene group and tetramethylene group. The polyalkylene terephthalate is preferably polyethylene terephthalate.

Another unit (third component) may be included in the recurring units of the fiber (component Af). An example of the third component is (a) a compound residue having two ester forming functional groups. Specific examples of a compound which provides the compound residue having two ester forming functional groups include aliphatic dicarboxylic acids such as oxalic acid, succinic acid, sebacic acid and dimer acid, alicyclic dicarboxylic acids such as cyclopropanedicarboxylic acid and hexahydroterephthalic acid, aromatic dicarboxylic acids such as phthalic acid, isophthalic acid, naphthalene-2,7-dicarboxylic acid and diphenylcarboxylic acid, carboxylic acids such as diphenyl ether dicarboxylic acid, diphenylsulfonic acid, diphenoxyethanedicarboxylic acid and sodium 3,5-dicarboxybenzenesulfonate, oxycarboxylic acids such as glycolic acid, p-oxybenzoic acid and p-oxyethoxybenzoic acid, and oxy compounds such as propylene glycol, trimethylene glycol, diethylene glycol, tetramethylene glycol, hexamethylene glycol, neopentylene glycol, p-xylene glycol, 1,4-cyclohexanedimethanol, bisphenol A, p,p'-dihydroxyphenylsulfone, 1,4-bis(β-hydroxyethoxy)benzene, 2,2-bis(p-β-hydroxyethoxyphenyl)propane and polyalkylene glycol. Derivatives thereof are also included. Polymer compounds comprising the above carboxylic acids and/or the above oxycarboxylic acid derivatives and polymer compounds comprising at least two compounds out of at least one compound selected from the above carboxylic acids and the above carboxylic acid derivatives, at least one compound selected from the above oxycarboxylic acids and the above oxycarboxylic acid derivatives and at least one compound selected from the above oxy compounds and the above oxy compound derivatives are also included in examples of the above third component source.

Another example of the third component is (b) a compound residue having one ester forming functional group. Specific examples of a compound which provides the compound residue having one ester forming functional group include benzoic acid, benzyloxybenzoic acid and methoxypolyalkylene glycol.

(c) A compound which provides a compound residue having 3 or more ester forming functional groups such as glycerin, pentaerythritol or trimethylolpropane may also be used as the third component source as long as the polymer is substantially linear.

A delustering agent such as titanium dioxide and a stabilizer such as phosphoric acid, phosphorous acid or an ester thereof may be contained in the polyester which accounts for not less than 80 mol % of the total of all the recurring unit of the fiber (component Af).

The fiber (component Af) has high resistance to mechanical impact and high affinity for a resin and exhibits a fiber reinforcing effect efficiently at a low-temperature range at which it is actually used.

The filament fineness of the fiber (component Af) is preferably 1 to 30 dtex, more preferably 1.5 to 25 dtex. The upper limit value of the filament fineness is preferably 20 dtex, more preferably 16 dtex. The lower limit value of the filament fineness is preferably 2 dtex. The object of the present invention is easily attained when the filament fineness of the fiber (component Af) falls within the above range. When the filament fineness is less than 1 dtex, a yarn-making problem tends to occur and when the fineness is too large, interface strength between the fiber and the resin tends to lower. The fineness is preferably not less than 1 dtex from the viewpoint of the dispersion of the fiber and preferably not more than 30 dtex from the viewpoint of the reinforcing effect.

The intrinsic viscosity of the polyalkylene terephthalate and/or the polyalkylene naphthalene dicarboxylate constituting the fiber (component Af) is preferably not less than 0.7 dl/g, more preferably 0.7 to 1.0 dl/g. The intrinsic viscosity is a value obtained from the viscosity measured at 35° C. of a solution prepared by dissolving the fiber in a mixed solvent of phenol and orthodichlorobenzene (volume ratio of 6:4). When the intrinsic viscosity is lower than 0.7 dl/g, not only the strength and toughness of the fiber but also the heat resistance of the fiber tend to degrade. When a material having an intrinsic viscosity higher than 1.0 dl/g is used, it may be difficult to produce the fiber.

The tensile strength of the fiber (component Af) is preferably 6 to 11 cN/dtex, more preferably 7 to 10 cN/dtex. When the tensile strength is lower than 6 cN/dtex, the tensile strength of the resin composition tends to lower. The tensile modulus of the fiber (component Af) is preferably 18 to 30 GPa, more preferably 20 to 28 GPa. When this value is small, the flexural strength of the resin composition is apt to lower.

The dry heat shrinkage factor at 180° C. of the fiber (component Af) is preferably not more than 8%, more preferably not more than 7%. When the dry heat shrinkage factor exceeds 8%, the dimensional change of the fiber by heat at the time of molding becomes large, thereby producing not only the bad molding shape of the resin composition but also a space between the resin and the fiber with the result of a reduced reinforcing effect.

The fiber (component Af) having such strength can be produced by a conventionally known method. That is, the fiber (component Af) can be obtained by further carrying out the solid-phase polymerization of a polyalkylene terephthalate and/or polyalkylene naphthalene dicarboxylate chip obtained by polymerization to fully increase its intrinsic viscosity, melt spinning the chip into yarn and stretching the obtained yarn. Spinning is preferably carried out to obtain a multifilament, the total fineness of the multifilament is 500 to 50,000 dtex, and the number of filaments is 25 to 25,000.

Unstretched yarn is taken up and then stretched after spinning. The unstretched yarn may be stretched continuously without being taken up. The fiber obtained by stretching has a high modulus and excellent dimensional stability.

The fiber (component Af) preferably has a low fiber converging property. For example, it is preferred that the interlacing and twisting of filaments should be rare and the amount of a yarn-making oil agent should be small. Fibers are divided into monofilament fibers, each composed of a single filament having a relatively high fineness which is used for special purposes, and multifilament fibers, each composed of 10 to 1,000 filaments having a fineness of 1 to 30 dtex. Out of these, the fiber used in the present invention is preferably a relatively inexpensive multifilament fiber which is generally used in apparel and industrial materials.

The fiber used in the present invention must ravel out into filaments in a resin, and the filaments must be finely and uniformly dispersed into the resin. To this end, the yarn converging property which is artificially provided is preferably low, and the number of interlaced filaments is less than 10/m, preferably less than 6/m, more preferably less than 4/m.

Whether the multifilament fiber is interlaced or not can be checked by launching the yarn. In this case, an uninterlaced part spreads over water as the filaments repel one another whereas an interlaced part does not spread due to the interlacing of the yarn and becomes a burl. The existence of interlacing can be checked by inserting a thin hook or bar into the multifilament and moving it in the longitudinal direction of the yarn. In this case, when there is no interlacing, the hook or bar can be moved in the yarn whereas when there is interlacing, the hook or bar cannot be moved farther. When the hook or bar is moved forcedly, the filaments are broken or the yarn may be broken at that part.

The amount of the yarn-making oil agent is preferably 0.5 to 0.1 wt %, more preferably 0.4 to 0.1 wt %, much more preferably 0.3 to 0.15 wt % based on the fiber (component Af). When the amount of the yarn-making oil agent is larger than 0.5 wt %, the converging property of the fiber is enhanced and also the oil component is contained in the molded article as an impurity, whereby it may exert a bad influence such as the deterioration of physical properties. To prevent this, the amount of the yarn-making oil agent is preferably small. However, when the amount is smaller than 0.1 wt %, processability in the yarn making process is affected, and the stable production of a high-quality fiber may become impossible. The yarn-making oil agent means an emulsifier and/or a smoothing agent used in the yarn making process such as spinning or stretching.

Examples of the emulsifier component include alkylene oxide adducts of a higher alcohol, alkylene oxide adducts of an alkyl phenol, polyethylene glycol ester compounds and polyhydric alcohol ester alkylene oxide adducts. More specific examples of the emulsifier component include an adduct of 5 to 25 moles of hardened castor oil ethylene oxide, trioleate of an adduct of 15 to 25 moles of castor oil ethylene oxide, distearate of an adduct of 15 to 25 moles of trimethylolpropane ethylene oxide, pentaoleate of an adduct of 15 to 40 moles of sorbitol ethylene oxide and tristearate of an adduct of 15 to 40 moles of pentaerythritol ethylene oxide.

Examples of the smoothing agent include natural oils such as mineral oil, palm oil, carola oil and sperm oil, esters of a higher alcohol and a higher fatty acid such as butyl stearate, oleyl laurate and isostearyl palmitate, esters of a higher alcohol and an aliphatic dibasic acid such as dioctyl sebacate and dioleyl adipate, esters of a dihydric alcohol and a higher fatty acid such as neopentyl glycol dilaurate and diethylne glycol dioleate, esters of a trihydric alcohol and a higher fatty acid such as glycerin trioleate and trimethylolpropane decanate, esters of a tetra or more hydric alcohol and a higher fatty acid such as pentaerythritol tetraoleate, and esters of a higher alcohol and an aromatic carboxylic acid such as dioleyl phthalate and trioctyl trimellitate.

The reduction of the converging property of the fiber is especially effective for the reinforcement of the resin composition. The fiber is easily opened in the step of impregnating a long fiber with a resin by using a pultrusion method so that the resin infiltrates into the filaments of the fiber. When the resin infiltrates into the filaments of the fiber and the surface of each filament can be coated with the resin, the filaments can be finely dispersed into the resin in the subsequent molding step, thereby making it possible to further enhance the impact resistance of the molded article.

(Sizing Agent: Component Ac)

In the resin composition of the present invention, the fiber component is a surface-treated fiber (component A) obtained by adhering a sizing agent (component Ac) to the surface of the above-described fiber (component Af).

The deposition of the sizing agent (component Ac) is preferably 0.1 to 10 parts by weight, more preferably 0.2 to 5 parts by weight based on 100 parts by weight of the fiber (component Af).

The glass transition temperature of a dry film of the sizing agent (component Ac) is −80 to 70° C. The lower limit of the glass transition temperature is preferably −60° C., more preferably −40° C. The upper limit of the glass transition temperature is preferably 65° C., more preferably 60° C., further preferably 30° C. When the glass transition temperature of the dry film of the sizing agent (component Ac) is lower than −80° C., the film becomes viscous, whereby the filaments are hardly dissociated in the kneading step and nonuniformity in the dispersion of the fiber readily occurs. When the glass transition temperature of the dry film of the sizing agent (component Ac) is higher than 70° C., the film becomes hard and too fragile, whereby the sizing agent is easily broken by an impact applied to a molded article, thereby reducing the effect of reinforcing the resin component by the fiber. The glass transition temperature is measured by a DSC method.

Since the sizing agent (component Ac) preferably reaches the surface of each filament of the fiber (component Af), it is suitably added to the fiber (component Af) by dipping. Therefore, a surface-treating liquid containing the sizing agent (component Ac) is preferably an aqueous emulsion or suspension. To reach the surface of each filament of the fiber (component Af), the dispersed particle diameter of the sizing agent (component Ac) in the emulsion or suspension is preferably small. The dispersed particle diameter is preferably not more than 0.2 μm, more preferably not more than 0.15 μm, much more preferably not more than 0.1 μm.

The sizing agent (component Ac) used in the present invention is preferably adhered to the surface of each filament of the multifilament fiber (component Af) uniformly so as to converge the filaments. However, it must dissociate the filaments by low shear in the step of kneading it with the resin component so as to disperse them into the resin component. To this end, the tensile strength and modulus of the dry film of the sizing agent (component Ac) are preferably low.

Therefore, the tensile strength of the dry film of the sizing agent (component Ac) is preferably 10 to 60 MPa, more preferably 20 to 50 MPa. When the tensile strength of the dry film of the sizing agent (component Ac) is in the range of 10 to 60 MPa, the film is hardly broken, the converging property can be provided to the surface-treated fiber (component A), the filaments are easily dissociated in the kneading step, and nonuniformity in the dispersion of the surface-treated fiber (component A) hardly occurs.

The modulus at an elongation of 100% of the dry film of the sizing agent (component Ac) is preferably 0.1 to 30 MPa, more preferably 1 to 20 MPa. When the modulus at an elongation of 100% of the dry film of the sizing agent (component Ac) is in the range of 0.1 to 30 MPa, the film is hardly broken, the filaments are easily dissociated in the kneading step, and nonuniformity in the dispersion of the surface-treated fiber (component A) hardly occurs.

The method of producing the dry film of the sizing agent (component Ac) used in the measurement of the tensile strength and the modulus at an elongation of 100% is as follows. A satisfactory dry film can be obtained by removing volatile matter by a casting method using a glass Petri dish or a Teflon Petri dish. The treating temperature is suitably selected from a range of room temperature to 120° C. and the treatment time can be suitably set according to a sample. The thickness of the film is preferably 0.1 to 1.0 mm, more preferably 0.5 to 1.0 mm. This film is processed according to measurement. For example, the film is punched into a dumbbell-like test piece as a tensile test sample for the measurement of tensile strength and elongation.

The elongation of the dry film of the sizing agent (component Ac) is preferably 20 to 2,500%, more preferably 200 to 2,000%, much more preferably 500 to 1,500%. When the elongation of the dry film is in the range of 20 to 2,500%, the resin film has flexibility, the polyurethane resin is hardly destroyed when an impact is applied to a molded article, the effect of reinforcing the resin component with the fiber becomes large, the filaments are easily dissociated in the kneading step, and nonuniformity in the dispersion of the fiber (component Af) hardly occurs.

Examples of the sizing agent (component Ac) include polyurethane resin, polyester resin, acrylic resin, epoxy resin, starch, vegetable oil and mixtures thereof. The sizing agent is preferably polyurethane resin.

Preferably, the sizing agent (component Ac) has a glass transition temperature of 0° C. or higher, and the dry film thereof has low tensile strength, a low modulus and an elongation of not more than 2,500%. This sizing agent (component Ac) provides a converging property to the surface-treated fiber (component A) in the process up to the step of mixing the surface-treated fiber (component A) with the resin component and can easily dissociate the multifilament into filaments by shear during the step of impregnating the surface-treated fiber with the resin component, thereby obtaining a higher-performance resin composition.

The dry film of the sizing agent (component Ac) is preferably soft with a glass transition temperature of lower than 30° C. and an elongation of not less than 20%. In this case, the effect of reinforcing the resin component with the fiber becomes large, thereby obtaining a high-performance resin composition.

The softening temperature of the sizing agent (component Ac) is preferably 80 to 160° C., more preferably 90 to 150° C., much more preferably 100 to 140° C. When the softening temperature is lower than 80° C., the resin is apt to fall off in the drying stage in the dipping step in the production of the surface-treated fiber (component A) and the dropped resin is adhered to a roller or guide of dipping equipment, thereby deteriorating the processability. When the softening temperature is higher than 160° C., the resin is hardly softened in the heat treatment stage in the dipping step and hardly spreads between the filaments of the fiber. Since the polyurethane resin has a suitable softening temperature, it softens in the heat treatment stage in the dipping step, whereby the resin can spread between the filaments of the fiber and exhibit the function of converging the fiber when the polyurethane resin is cooled. The softening temperature is a flow starting temperature measured by a kouka-shiki flow tester (constant-load orifice-type flow tester).

The sizing agent is preferably a polyurethane resin. The polyurethane resin used in the present invention can be obtained by addition polymerizing a compound having two hydroxyl groups in the molecule (to be referred to as "diol component" hereinafter) and a compound having two isocyanate groups in the molecule (to be referred to as "diisocyanate component" hereinafter) in an organic solvent containing no water and no active hydrogen. The polyurethane resin of interest can also be obtained by directly reacting these raw materials in the absence of a solvent.

Examples of the diol component include polyol compounds such as polyester diols, polyether diols, polycarbonate diols, polyether ester diols, polythioether diols, polyacetals and polysiloxanes, and glycols having a low molecular weight such as ethylene glycol, 1,4-butanediol, 1,6-hexanediol, 3-methyl-1,5-pentanediol and diethylene glycol. The polyurethane resin used in the present invention preferably contains a large amount of a low-molecular weight glycol component.

The sizing agent may contain a coupling agent to improve wettability and adhesion to the resin component. Examples of the coupling agent include silane-based coupling agents, titanate-based coupling agents, aluminum-based coupling agents, chromium-based coupling agents, zirconium-based coupling agents and borane-based coupling agents, out of which, silane-based coupling agents and titanate-based coupling agents are preferred, and silane-based coupling agents are more preferred.

The silane-based coupling agents include triethoxysilane, vinyl tris(β-methoxyethoxy)silane, γ-methacryloxypropyltrimethoxysilane, γ-glycidoxypropyltrimethoxysilane, β-(3, 4-epoxycyclohexyl)ethyl triethoxysilane, N-β-(aminoethyl)-γ-aminopropyl trimethoxysilane, N-β-(aminoethyl)-γ-aminopropylmethyl dimethoxysilane, γ-mercaptopropyltrimethoxysilane and γ-chloropropyltrimethoxysilane. Out of these, aminosilanes such as γ-aminopropyltriethoxysilane and N-β-(aminoethyl)-γ-aminopropyl trimethoxysilane are preferred.

The content of the coupling agent in the sizing agent is preferably 0.01 to 10 wt %, more preferably 0.02 to 5 wt %.

(Surface Treatment)

In the present invention, the surface-treated fiber (component A) is obtained by adhering the sizing agent (component Ac) to the surface of the fiber (component Af). Preferably, a fiber bundle is impregnated with a surface-treating solution containing the sizing agent (component Ac) and dried by heating. It is most preferred from the viewpoints of the retention of the strength of the fiber and the adhesion of the treating agent that the drying temperature should be 80 to 200° C. and that the time should be about 30 to 300 seconds. The drying machine is preferably a non-contact type drying machine in order to maintain the surface state of the fiber.

<Resin Component>

(Ethylene-Based Copolymer: Component B)

The resin composition of the present invention comprises an ethylene-based copolymer containing a glycidyl group (component B) as a resin component.

The ethylene-based copolymer (component B) contains a unit (4) represented by the following formula.

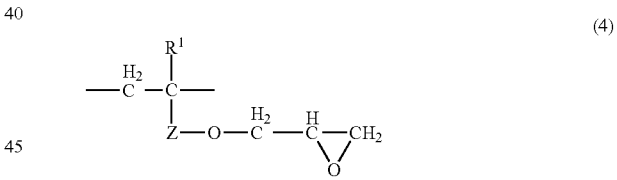

(4)

In the above formula, $R^1$ is an alkyl group having 1 to 4 carbon atoms such as methyl group, ethyl group, propyl group or butyl group. Z is —CO— or —CH$_2$—.

The unit (4) is a unit derived from a monomer having a glycidyl group. Examples of the monomer having a glycidyl group include α,β-unsaturated glycidyl esters such as glycidyl methacrylate and glycidyl acrylate, and α,β-unsaturated glycidyl ethers such as allyl glycidyl ether and 2-methylally glycidyl ether. Glycidyl methacrylate is preferred.

The ethylene-based copolymer (component B) contains a unit (5) represented by the following formula.

(5)

In the above formula, $R^2$ is a hydrogen atom or alkyl group having 1 to 4 carbon atoms such as methyl group, ethyl group, propyl group or butyl group. $R^3$ is a hydrogen atom, —$COOR^4$ or —O—CO—$R^5$ ($R^4$ and $R^5$ are each independently a hydrogen atom or alkyl group having 1 to 4 carbon atoms such as methyl group, ethyl group, propyl group or butyl group).

The unit (5) is a unit derived from an unsaturated carboxylic acid ester such as methyl acrylate, ethyl acrylate, methyl methacrylate or butyl acrylate, or an unsaturated vinyl ester such as vinyl acetate or vinyl propionate.

The content of the unit (4) in the ethylene-based copolymer (component B) is preferably 0.1 to 10 mol%, more preferably 1.0 to 5.0 mol %. The content of the unit (5) in the ethylene-based copolymer (component B) is preferably 0.1 to 20 mol %, more preferably 1.0 to 15 mol %. The content of the unit (4) in the ethylene-based copolymer (component B) can be measured in accordance with the method described in WO2008/081791. The content of the unit (5) can be measured from the infrared absorption spectrum.

The ethylene-based copolymer (component B) preferably does not have a monomer unit derived from an aromatic vinyl compound from the viewpoint of compatible dispersibility in the modified polyolefin resin (component C). Examples of the aromatic vinyl compound include styrene, α-methylstyrene, 4-methylstyrene, 4-methoxystyrene, chlorostyrene and 2,4-dimethylstyrene.

The melt flow rate (MFR) of the ethylene-based copolymer (component B) is preferably 0.1 to 500 g/10 min, more preferably 10 to 400 g/10 min. The melt flow rate as used herein is measured under a load of 21.18 N at a test temperature of 190° C. in accordance with the method specified in JIS K7210 (1995).

The ethylene-based copolymer (component B) can be produced by copolymerizing a monomer having a glycidyl group and ethylene and optionally another monomer or by graft polymerizing a monomer having a glycidyl group onto an ethylene-based resin in accordance with high-pressure radical polymerization, solution polymerization or emulsion polymerization.

(Modified Polyolefin Resin: Component C)

The resin composition of the present invention comprises a modified polyolefin resin (component C) as a resin component. The modified polyolefin resin (component C) is a resin obtained by modifying a polyolefin resin with an unsaturated carboxylic acid and/or an unsaturated carboxylic acid derivative.

The polyolefin resin as a raw material of this modified polyolefin resin (component C) is identical to the polyolefin resin (component D) which will be described hereinafter and a resin which is a homopolymer of one olefin or a copolymer of two or more olefins. Therefore, it can be said that the modified polyolefin resin (component C) is the same as the polyolefin resin (component D) which will be described hereinafter except that it is modified with an unsaturated carboxylic acid and/or an unsaturated carboxylic acid derivative.

In other words, the modified polyolefin resin (component C) is a resin produced by reacting a homopolymer of one olefin or a copolymer of two or more olefins with an unsaturated carboxylic acid and/or an unsaturated carboxylic acid derivative and has a partial structure derived from the unsaturated carboxylic acid or the unsaturated carboxylic acid derivative in the molecule. Specific examples of the modified polyolefin resin include the following modified polyolefin resins (C-a) to (C-C). They may be used alone or in combination of two or more.

(C-a): a modified polyolefin resin obtained by graft polymerizing an unsaturated carboxylic acid and/or an unsaturated carboxylic acid derivative onto a homopolymer of an olefin (C-b): a modified polyolefin resin obtained by graft polymerizing an unsaturated carboxylic acid and/or an unsaturated carboxylic acid derivative onto a copolymer obtained by copolymerizing two or more olefins (C-c): a modified polyolefin resin obtained by graft polymerizing an unsaturated carboxylic acid and/or an unsaturated carboxylic acid derivative onto a block copolymer obtained by copolymerizing two or more olefins after one olefin is homopolymerized Examples of the unsaturated carboxylic acid include maleic acid, fumaric acid, itaconic acid, acrylic acid and methacrylic acid.

The unsaturated carboxylic acid derivative is selected from an acid anhydride, ester compound, amide compound, imide compound and metal salt of an unsaturated carboxylic acid. Specific examples of the unsaturated carboxylic acid derivative include maleic anhydride, itaconic anhydride, methyl acrylate, ethyl acrylate, butyl acrylate, methyl methacrylate, ethyl methacrylate, butyl methacrylate, 2-hydroxyethyl methacrylate, maleic acid monoethyl ester, maleic acid diethyl ester, fumaric acid monomethyl ester, fumaric acid dimethyl ester, acrylamide, methacrylamide, maleic acid monoamide, maleic acid diamide, fumaric acid monoamide, male imide, N-butylmaleimide and sodium methacrylate. Out of these compounds, maleic acid and acrylic acid are preferably used as the unsaturated carboxylic acid, and maleic anhydride and 2-hydroxyethyl methacrylate are preferably used as the unsaturated carboxylic acid derivative.

(C-c) is preferred as the above modified polyolefin resin (component C). Out of (C-c), the following (C-d) is more preferably used.

(C-d): a modified polyolefin resin obtained by graft polymerizing maleic anhydride or 2-hydroxyethyl methacrylate onto a polyolefin resin containing a unit derived from an olefin(s) such as ethylene and/or propylene as the main monomer unit The content of the monomer unit derived from the unsaturated carboxylic acid and/or the unsaturated carboxylic acid derivative in the modified polyolefin resin (component C) is preferably 0.1 to 20 wt %, more preferably 0.1 to 10 wt % to improve the mechanical strength such as impact strength, fatigue characteristics and stiffness of the obtained molded article. As the content of the monomer unit derived from the unsaturated carboxylic acid and/or the unsaturated carboxylic acid derivative is used a value calculated by determining the quantity of absorption based on the unsaturated carboxylic acid and/or the unsaturated carboxylic acid derivative from an infrared absorption spectrum or NMR spectrum.

The graft ratio of the unsaturated carboxylic acid and/or the unsaturated carboxylic acid derivative of the modified polyolefin resin (component C) is preferably not less than 0.51 from the viewpoint of the mechanical properties of the molded article. The graft ratio can be obtained by the following (procedure 1) and (procedure 2).

(Procedure 1)

After 1.0 g of the modified polyolefin is dissolved in 100 ml of xylene, the obtained xylene solution as a sample is added dropwise to 1,000 ml of methanol under agitation to collect the sample by re-precipitation. (The above operation from dissolution to collection is called "purification".) After the collected purified sample is vacuum dried (80° C., 8 hours), a film having a thickness of 100 μm is formed by a thermal press. The content (X1) of the unsaturated carboxylic acid and/or the unsaturated carboxylic acid derivative which are/is reacted with the polyolefin resin contained in the modified polyolefin is calculated by determining the quantity of absorption based on the unsaturated carboxylic acid and/or the unsaturated carboxylic acid derivative from the infrared absorption spectrum of this formed film.

(Procedure 2)

A film having a thickness of 100 μm is formed by a thermal press from the modified polyolefin resin before purification when the content of the unsaturated carboxylic acid and/or the unsaturated carboxylic acid derivative is obtained by the above method (procedure 1). The content (X2) of the unsaturated carboxylic acid and/or the unsaturated carboxylic acid derivative in the modified polyolefin is calculated by determining the quantity of absorption based on the unsaturated carboxylic acid and/or the unsaturated carboxylic acid derivative from the infrared absorption spectrum of this formed film. The graft ratio is calculated by dividing the content (X1) obtained by the above procedure 1 with the content (X2) obtained by the above procedure 2.

These modified polyolefin resins (component C) can be produced by a solution process, bulk process or melt kneading process. Two or more of these processes may be used in combination. Examples of the solution process, bulk process and melt kneading process include processes described, for example, in "Practical Polymer Alloy Design" (written by Fumio Ide, the Institute of Industrial Research (issued in 1996)), Prog. Polym., Sci., 24, 81-142 (1999), JP-A 2002-308947, JP-A 2004-292581, JP-A 2004-217753 and JP-A 2004-217754.

(Polyolefin Resin: Component D)

The resin composition of the present invention further comprises a polyolefin resin having a melt flow rate of 40 to 200 g/10 min (component D). The polyolefin resin (component D) is a resin composed of a homopolymer of one olefin or a copolymer of two or more olefins but not the polyolefin resin modified with an unsaturated carboxylic acid or an unsaturated carboxylic acid derivative (component C) and the ethylene-based copolymer containing a glycidyl group (component B). Examples of the polyolefin resin (component D) include polypropylene resin and polyethylene resin. Polypropylene resin is preferred as the polyolefin resin (component D). The polyolefin resin (component D) may be a single polyolefin resin or a mixture of two or more polyolefin resins.

Examples of the polypropylene resin include a propylene homopolymer, propylene-ethylene random copolymer, propylene-α-olefin random copolymer, propylene-ethylene-α-olefin random copolymer and propylene-based block copolymer obtained by homopolymerizing propylene to form a propylene homopolymer and copolymerizing ethylene with propylene in the presence of the propylene homopolymer. The α-olefin is preferably an α-olefin having 4 to 8 carbon atoms. A propylene homopolymer and a propylene-based block copolymer obtained by copolymerizing ethylene with propylene after propylene is homopolymerized are preferred as the polypropylene resin from the viewpoint of heat resistance.

The content of a monomer unit derived from ethylene in the propylene-ethylene random copolymer (the total amount of propylene and ethylene is 100 mol %), the content of a monomer unit derived from the α-olefin in the propylene-α-olefin random copolymer (the total amount of propylene and the α-olefin is 100 mol %) and the total content of monomer units derived from ethylene and the α-olefin in the propylene-ethylene-α-olefin random copolymer (the total content of propylene, ethylene and the α-olefin is 100 mol %) are all less than 50 mol %. The above content of ethylene, the content of the α-olefin and the total content of ethylene and the α-olefin are measured by the IR or NMR method described in "New Edition of Polymer Analysis Handbook" (edited by the Polymer Analysis Research Committee of the Chemical Society of Japan and published by Kinokuniya Shoten (1995)).

Examples of the polyethylene resin include an ethylene homopolymer, ethylene-propylene random copolymer and ethylene-α-olefin random copolymer. The α-olefin is preferably an α-olefin having 4 to 8 carbon atoms. The content of a monomer unit derived from propylene in the ethylene-propylene random copolymer (the total content of ethylene and propylene is 100 mol %), the content of the α-olefin in the ethylene-α-olefin random copolymer (the total amount of ethylene and the α-olefin is 100 mol %) and the total content of propylene and the α-olefin in the ethylene-propylene-α-olefin random copolymer (the total amount of ethylene, propylene and the α-olefin is 100 mol %) are all less than 50 mol %.

Examples of the α-olefin as a constituent component of the polyolefin resin (component D) include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, trimethyl-1-pentene, propyl-1-pentene and diethyl-1-butene. The α-olefin is preferably an α-olefin having 4 to 8 carbon atoms (such as 1-butene, 1-pentene, 1-hexene or 1-octene).

The polyolefin resin (component D) can be produced by solution polymerization, slurry polymerization, bulk polymerization and vapor-phase polymerization processes. These polymerization processes may be used alone or in combination of two or more. More specific examples of the production process of the polyolefin resin (component D) include polymerization processes described in "New Polymer Production Process" (edited by Yasuji Saeki and published by the Institute of Industrial Research (issued in 1994)), JP-A 4-323207 and JP-A 61-287917.

The catalyst used in the production of the polyolefin resin (component D) is a multi-site catalyst or a single-site catalyst. Preferred examples of the multi-site catalyst include catalysts obtained by using a solid catalyst component containing a titanium atom, magnesium atom or halogen atom. Preferred examples of the single-site catalyst include metallocene catalysts. The preferred catalyst used to produce the polypropylene resin as the polyolefin resin (component D) is a catalyst obtained by using a solid catalyst component containing a titanium atom, magnesium atom or halogen atom.

The melt flow rate (MFR) of the polyolefin resin (component D) is 40 to 200 g/10 min, preferably 40 to 150 g/10 min from the viewpoints of the dispersibility of the surface-treated polyester fiber (component A) in the molded article, the deterioration of the appearance of the molded article and impact strength. MFR is a value measured at 230° C. under a load of 21.2 N in accordance with ASTM D1238.

The isotactic pentad fraction of a propylene homopolymer as the polyolefin resin (component D) is preferably 0.95 to 1.00, more preferably 0.96 to 1.00, much more preferably 0.97 to 1.00. The isotactic pentad fraction is a fraction of propylene monomer units which are present at the center of an isotactic chain in the form of a pentad unit in the polypropylene molecular chain, in other words, a fraction of propylene monomer units present at the center of a chain in which five propylene monomer units are meso-bonded successively in the polypropylene molecular chain, measured by the method disclosed by A. Zambelli et al. in Macromolecules, vol. 6, p. 925 (1973), namely, a method using $^{13}$C-NMR. NMR absorption peaks are assigned according to the disclosure of Macromolecules, vol. 8, p. 687 (1975).

When the polyolefin resin (component D) is a propylene-based block copolymer obtained by copolymerizing ethylene with propylene after propylene is homopolymerized, the isotactic pentad fraction of the above propylene homopolymer moiety is preferably 0.95 to 1.00, more preferably 0.96 to 1.00, much more preferably 0.97 to 1.00.

The content of the ethylene-propylene copolymer in the propylene-based block copolymer obtained by copolymerizing ethylene with propylene after propylene is homopolymerized is preferably 10 to 20 wt %.

The content of the monomer unit derived from ethylene contained in the ethylene-propylene copolymer in the propylene-based block copolymer obtained by copolymerizing ethylene with propylene after propylene is homopolymerized is preferably 25 to 45 wt %.

(Composition Ratio)

The content of the ethylene-based copolymer (component B) in the resin composition of the present invention is preferably 0.1 to 600 parts by weight, more preferably 0.2 to 420 parts by weight, much more preferably 0.3 to 300 parts by weight based on 100 parts by weight of the surface-treated fiber (component A).

The content of the modified polyolefin resin (component C) is preferably 0.3 to 500 parts by weight, more preferably 0.5 to 360 parts by weight, much more preferably 1 to 250 parts by weight based on 100 parts by weight of the surface-treated fiber (component A).

The content of the polyolefin resin (component D) is 30 to 850 parts by weight, preferably 75 to 850 parts by weight, more preferably 150 to 850 parts by weight based on 100 parts by weight of the component A.

The total content of the ethylene-based copolymer (component B) and the modified polyolefin (component C) is 5 to 630 parts by weight, preferably 8 to 450 parts by weight, more preferably 11 to 315 parts by weight based on 100 parts by weight of the component A.

The content of the ethylene-based copolymer (component B) and the content of the modified polyolefin (component C) preferably satisfy the following equation so as to reinforce adhesion between the surface-treated fiber and the resin component efficiently.

$$0.02 \leq Cx \cdot Cy/Bx \cdot By \leq 3.0$$

It is more preferably to satisfy the following equation.

$$0.02 \leq Cx \cdot Cy/Bx \cdot By \leq 0.8$$

Bx: content (wt %) of ethylene-based copolymer (component B)
By: content (wt %) of monomer unit having a glycidyl group in ethylene-based copolymer (component B)
Cx: content (wt %) of modified polyolefin resin (component C)
Cy: content (wt %) of monomer unit derived from unsaturated carboxylic acid and/or unsaturated carboxylic acid derivative in modified polyolefin resin (component C)

Bx·By and Cx·Cy can be calculated from the infrared absorption spectra by the following method.

Method of Calculating Bx·By

The absorbance of the characteristic absorption of the infrared absorption spectrum of a pressed sheet obtained by the following method is corrected with thickness so as to obtain the content of the monomer unit having a glycidyl group in the resin moiety by a calibration curve method. A peak at 910 cm$^{-1}$ is used as the characteristic absorption of the monomer unit having a glycidyl group. Bx·By is calculated by multiplying the weight of the resin composition by the calculated content.

Method of Calculating Cx·Cy

The absorbance of the characteristic absorption of the infrared absorption spectrum of a pressed sheet obtained by the following method is corrected with thickness so as to obtain the content of the monomer unit having a glycidyl group in the resin moiety by the calibration curve method. A peak at 1780 cm$^{-1}$ is used as the characteristic absorption of the monomer unit derived from the unsaturated carboxylic acid and/or the unsaturated carboxylic acid derivative. Cx·Cy is calculated by multiplying the weight of the resin composition by the calculated content.

For the measurement of the infrared absorption spectrum, 1.0 g of the resin composition of the present invention is dissolved in 100 ml of xylene, the xylene solution of the sample is added dropwise to 1,000 ml of methanol under agitation to collect the sample by re-precipitation, the collected sample is vacuum dried (80° C., 8 hours), and a film (pressed sheet) having a thickness of 100 μm obtained by a thermal press is used as a measurement sample.

The resin composition of the present invention may contain at least one elastomer. Examples of the elastomer include polyolefin-based elastomers, polyester-based elastomers, polyurethane-based elastomers and PVC-based elastomers.

The resin composition of the present invention may also comprise an antioxidant, a heat-resistant stabilizer, a neutralizer, a stabilizer such as ultraviolet absorbent, an antifoaming agent, a flame retardant, a flame retardant aid, a dispersant, an antistatic agent, a lubricant, an antiblocking agent such as silica, a colorant such as dye or pigment, a plasticizer, a nucleating agent and a crystallization accelerator.

The resin composition may further comprise a lamellar, particulate or whisker inorganic compound such as glass flakes, mica, glass powders, glass beads, talc, clay, alumina, carbon black or wollastonite.

<Process for Producing Resin Composition>

The resin composition of the present invention can be produced by the following processes (1) to (3):
(1) a process in which all the components are mixed together to prepare a mixture and the mixture is melt kneaded;
(2) a process in which all the components are added sequentially to obtain a mixture, and the mixture is melt kneaded;
(3) a pultrusion process.

In the above processes (1) and (2), a Henschel mixer, ribbon blender or blender may be used to obtain a mixture to be melt kneaded. A Banbury mixer, plastomill, bravender plastograph, or single-screw or double-screw extruder may be used to melt knead the mixture.

The resin composition of the present invention can be produced by the pultrusion process. The pultrusion process is preferred from the viewpoints of the production ease of the resin composition and the mechanical strength such as impact strength of the obtained molded article. The pultrusion process is to impregnate a bundle of fibers with a resin while the continuous bundle of fibers is pulled and includes the following techniques (1) to (3):
(1) one in which a fiber bundle is let pass through an impregnation tank containing an emulsion, suspension or solution containing a resin component and a solvent to impregnate the fiber bundle with the emulsion, suspension or solution and then the solvent is removed;
(2) one in which a fiber bundle is sprayed with resin component powders or let pass through a tank containing the resin component powders to adhere the resin component powders to the fibers, and the powders are molten to impregnate the fiber bundle with the resin component; and (3) one in which a molten resin component is supplied from an extruder to a cross head while a fiber bundle is let pass through the cross head so as to impregnate the fiber bundle with the resin component.

The resin composition constituting the molded article of the present invention is preferably produced by the pultrusion process (3) using the cross head, more preferably by the pultrusion process using the cross head described in JP-A 3-272830.

In the above pultrusion process, the operation of impregnating the resin component may be carried out in one stage, or two or more stages. A resin composition pellet produced by the pultrusion process and a resin composition pellet produced by the melt kneading process may be blended together.

When the resin composition pellet is to be injection molded, the length of the resin composition pellet produced by the pultrusion process is preferably 2 to 50 mm because it is easily charged into a mold cavity for injection molding and a molded article having high strength is obtained. The length is more preferably 3 to 20 mm, particularly preferably 5 to 15 mm. When the total length of the resin composition pellet is less than 2 mm, the effect of improving stiffness, heat resistance, impact strength and damping property may be small as compared with a resin composition containing no surface-treated fiber (component A). When the total length of the resin composition pellet is larger than 50 mm, molding may become difficult.

The length of the resin composition pellet produced by the pultrusion process and the weight average fiber length of the surface-treated fibers (component A) contained in the resin composition pellet are equal to each other. That the length of the resin composition pellet and the length of each of the surface-treated fibers (component A) contained in the resin composition pellet are equal to each other means that the weight average fiber length of the surface-treated fibers (component A) contained in the resin composition pellet is 90 to 110% of the total length of the pellet.

The weight average fiber length is measured by the method (excluding the ashing step) described in JP-A 2002-5924. That is, the length of each fiber is measured through the following steps (ii) to (iv):

(ii) uniformly dispersing the fibers into a liquid whose weight is 1,000 times or more larger than the total weight of the fibers;

(iii) taking out part of the homogeneous dispersion which contains 0.1 to 2 mg of the fibers; and (iv) collecting the fibers from that part of the homogeneous dispersion by filtration or drying to measure the lengths of all the collected fibers.

The weight average fiber length of the surface-treated fibers (component A) contained in the resin composition pellet is preferably 2 to 50 mm, more preferably 3 to 20 mm, much more preferably 5 to 15 mm. In the resin composition pellet used to produce the injection molded article of the present invention, the surface-treated fibers (component A) are generally parallel to one another.

<Molded Article>

The present invention includes a molded article obtained from the resin composition of the present invention. The molding techniques include injection molding, injection compression molding and extrusion molding.

The weight average fiber length of the surface-treated fibers (component A) contained in the molded article of the present invention is preferably not less than 1 mm. The weight average fiber length of the surface-treated fibers (component A) contained in the molded article is more preferably 1 to 10 mm from the viewpoints of the mechanical strength, durability and damping property of the molded article.

Examples of the molded article of the present invention include car interior parts and engine room parts which require heat-resistant stiffness, and car exterior parts which require mechanical strength, durability, vibration damping property and a good appearance.

The exterior parts include fenders, over-fenders, grille guards, cowl louvers, wheel caps, side protectors, side moldings, side lower skirts, front grilles, side steps, roof rails, rear spoilers and bumpers. The interior parts include lower instrument panels and trims. The engine parts include bumper beams, cooling fans, fan shrouds, lamp housings, car heater cases, fuse boxes and air cleaner cases.

The applications of the molded article of the present invention include parts of electric appliances, parts of machines and parts of structures. The parts of electric appliances include electric tools, cameras, video cameras, microwave ovens, electric rice cookers, pots, vacuum cleaners, personal computers, copiers, printers and mechanical housings for FDD and CRT. The parts of machines include pump casings. The parts of structures include tanks, pipes and construction formworks.

EXAMPLES

The following examples and comparative examples are provided for the purpose of further illustrating the present invention but are in no way to be taken as limiting. The evaluation methods in the examples and comparative examples are given below.

(1) Intrinsic Viscosity of Fiber 1.2 g of the fiber was added to 100 ml of orthochlorophenol to be dissolved at 100° C. The intrinsic viscosity of the fiber was measured in an isothermal bath at 35° C. with an Ostwald's viscometer.

(2) Tensile Strength and Tensile Modulus of Fiber

They were measured at a chuck interval of 25 cm and a pulling rate of 30 cm/min in accordance with JIS-L1013.

(3) Dry Heat Shrinkage Factor at 180° C. of Fiber

The shrinkage factor of the fiber which was heated at 180° C. for 30 minutes was measured in accordance with the method B (filament shrinkage factor) of JIS-L1013.

(4) Glass Transition Temperature of Film

A test piece having a film thickness of 50 μm and a width of 4 mm was formed and measured by the DSC method.
Sample weight: 10.0 mg
In $N_2$ atmosphere
Temperature: −100 to 200° C.
Temperature elevation rate: 20° C./min (5) Tensile Strength, Elongation and 100% Modulus of Film A test piece measuring 4 cm×0.5 cm and having a thickness of 150 μm was prepared to measure its tensile strength and elongation at a test speed of 300 mm/sec. Stress at breakage (tensile strength) is taken as tensile strength, and stress at an elongation of 100% is taken as 100% modulus.

(6) Modification rate (unit: -)

$$\text{Modification rate} = Cx \cdot Cy/Bx \cdot By$$

Bx: content of ethylene-based copolymer (component B)
By: content of monomer unit having a glycidyl group in component B
Cx: content of modified polyolefin resin (component C)
Cy: content of monomer unit derived from unsaturated carboxylic acid and/or unsaturated carboxylic acid derivative in component C (7) Surface Impact Strength, Specific Gravity and Weight Average Fiber Length of Molded Article A sample (80 mm×80 mm×3 mm in thickness) obtained by injection molding the obtained fiber-containing pellet under the following conditions with the following molding machine was used to measure its surface impact strength, specific gravity and weight average fiber length.

[Molding Machine]
Molding machine: J150E molding machine of The Japan Steel Works, Ltd.
clamping force: 150 t
screw: deep-groove screw
screw diameter: 46 mm
screw L/D: 20.3
[Molding Conditions]
Cylinder temperature: 200° C.
Mold temperature: 50° C.
Back pressure: 0 MPa
(i) Surface impact strength (unit: J)

The surface impact strength of the sample was obtained by measuring the displacement and load waveform of a punched sample measuring 80 mm×80 mm and having a thickness of 3 mm fixed by a ring having a hole diameter of 2 inches at a dart diameter of ½ inch and a speed of 5 m/sec with HIGH RATE IMPACT TESTER (of Reometrics. Inc.). Thereafter, the energy value required for punching was calculated.

(ii) Specific Gravity

This was measured in accordance with ASTM D792.

(iii) Weight Average Fiber Length (Unit: mm)

The resin was removed from the sample by a Soxhlet extraction method (solvent: xylene) to collect fibers so as to measure the weight average fiber length of the fibers by the following method. That is, the length of each fiber was measured by the following steps (i) to (iii):

(i) uniformly dispersing the fibers into a liquid whose weight was 1,000 times or more larger than the total weight of the fibers;

(ii) taking out part of the homogeneous dispersion which contained 0.1 to 2 mg of the fibers; and (iii) collecting the fibers from that part of the homogeneous dispersion by filtration or drying to measure the lengths of all the collected fibers so as to obtain the average value Preparation Example 1

Preparation of Surface-Treated Fiber A-1

After a polyethylene-2,6-naphthalene dicarboxylate (may be abbreviated as PEN hereinafter) chip having an intrinsic viscosity of 0.62 was pre-dried at 120° C. under a vacuum degree of 65 Pa for 2 hours, the solid-phase polymerization of the chip was carried out at 240° C. under the same vacuum degree for 10 to 13 hours to obtain a PEN chip having an intrinsic viscosity of 0.84.

This chip was delivered from a spinneret having 144 circular holes with a diameter of 0.8 mm at a polymer temperature of 310° C. The delivery rate was adjusted to ensure that the fineness after spinning and stretching became 1,670 dtex. The delivered yarn was then sprayed with 25° C. cooling air through a thermal spinning cylinder to be cooled. Thereafter, a predetermined amount of a spinning oil agent prepared by mixing together canola oil, hardened castor oil adduct of 17 moles of ethylene oxide and dioctyl sulfosuccinate was weighed, supplied and applied to the yarn to ensure that the deposition of the oil agent after drying became 0.3 wt % of the total weight of the fibers by an oil application device, and the yarn was guided to a take-up roller to be taken up by the roller as unstretched yarn.

Then, this unstretched yarn was stretched to 5.0 times between a 150° C. heated feed roller and a 180° C. first-stage stretching roller which rolled at a speed of 130 m/min as first-stage stretching, let pass through a non-contact setting bath (length of 70 cm) heated at 230° C. between the first-stage stretching roller and a second-stage stretching roller heated at 180° C. to carry out fixed-length thermal setting and then taken up by a winder. Interlacing by spraying compressed air was not carried out before taking up. The obtained stretched yarn had a fineness of 1,670 dtex, and the diameter of each filament constituting the multifilament was 33 μm (to be referred to as "PEN fiber" hereinafter). As this fiber had an intrinsic viscosity of 0.90, a tensile strength of 7.9 cN/dtex, a tensile modulus of 165 cN/dtex and a dry heat shrinkage factor at 180° C. of 5.9%, it had a high modulus and excellent dimensional stability.

(Preparation of Surface-Treating Solution (a))

A polyester-based polyurethane resin which had a carboxylate as a hydrophilic component in the molecule and self-emulsified stably in water (solid content of 23 wt %, softening temperature of 110° C.) was diluted with water to ensure that the concentration of the polyurethane resin in the treating solution became 10 wt % so as to prepare a surface-treating solution (a). The water dispersed particle diameter of the polyurethane resin emulsion in this surface-treating solution (a) was 35 nm.

(Physical Properties of Film)

As for the physical properties of a film obtained by evaporating water as volatile matter from the surface-treating solution (a), the film had a tensile strength of 44 MPa, an elongation of 500%, a 100% modulus of 7 MPa and a glass transition temperature of 7° C.

(Surface Treatment)

The PEN fiber was dipped in the surface-treating solution (a). Thereafter, the fiber was heated at 180° C. for 60 seconds with a non-contact heater to obtain a polyurethane surface-treated PEN fiber (to be referred to as "A-1" hereinafter). The deposition of the sizing agent solid matter was 3.1 parts by weight based on 100 parts by weight of the PEN fiber.

Preparation Example 2

Preparation of Surface-Treated Fiber A-2

(Preparation of Surface-Treating Solution (b))

A polyester-based polyurethane resin which self-emulsified stably in water (solid content of 20 wt %, softening temperature of 113° C.) was diluted with water to ensure that the concentration of the polyurethane resin in the treating solution became 8 wt % to prepare a surface-treating solution (b). The water dispersed particle diameter of the polyurethane resin emulsion in this surface-treating solution (b) was 61 nm.

(Physical Properties of Film)

As for the physical properties of a film obtained by evaporating water as volatile matter from the surface-treating solution (b), the film had a tensile strength of 35 MPa, an elongation of 30% and a glass transition temperature of 61° C.

(Surface Treatment)

The PEN fiber used in Preparation Example 1 was dipped in the surface-treating solution (b). Thereafter, the fiber was dried at 180° C. for 60 seconds with a non-contact heater to obtain a polyurethane surface-treated PEN fiber (to be referred to as "A-2" hereinafter). The deposition of the sizing agent solid matter was 2.3 parts by weight based on 100 parts by weight of the PEN fiber.

Comparative Preparation Example 1

Preparation of Surface-Treated Fiber A-3

(Preparation of Surface-Treating Solution (c))

A surface-treating solution (c) having a total solids content of 5 wt % was prepared by using 0.5 wt % of a polyepoxide compound (solid content of 100 wt %), 11.3 wt % of blocked polyisocyanate (solid content of 40 wt %) and 88.2 wt % of water (the total of the polyepoxide compound, the blocked polyisocyanate and water was 100 wt %).
(Surface Treatment)

The PEN fiber used in Preparation Example 1 was dipped in this surface-treating solution (c). The PEN fiber was heated at 240° C. for 60 seconds with a non-contact heater to obtain a surface-treated PEN fiber (A-3). The deposition of the sizing agent solid matter was 4.0 parts by weight based on 100 parts by weight of the PEN fiber.

Since the film formed by this sizing agent was fragile, its physical properties could not be measured. Although the measurement of the glass transition temperature was carried out by the DSC method, the decomposition temperature was 100° C. or higher and the glass transition temperature could not be detected.
<Ethylene-Based Copolymer (B-1)>

An ethylene-glycidyl methacrylate copolymer (Bond Fast of Sumitomo Chemical Co., Ltd., grade: CG5001, MFR (load of 21.18N, test temperature of 190° C.) of 380 g/10 min, glycidyl methacrylate content of 19 wt %) was used as the ethylene-based copolymer (B-1).
<Preparation of Modified Polypropylene (C-1)>

1.0 part by weight of maleic anhydride, 0.50 part by weight of dicetyl peroxydicarboxylate, 0.15 part by weight of 1,3-bis(t-butylperoxydiisopropyl)benzene, 0.05 part by weight of calcium stearate and 0.3 part by weight of tetrakis[methylene-3-(3,5-di-t-butyl-4-hydroxyphenyl)propionate]methane as an antioxidant were added to and fully premixed with 100 parts by weight of a propylene block copolymer (intrinsic viscosity [η] of 2.8 (dl/g), EP content of 21 wt %], and the pre-mixture was supplied from the feed port of a single-screw extruder to be kneaded so as to obtain a modified polyolefin resin (C-1).

The single-screw extruder used was the EXT-90 single-screw extruder of Isuzu Kakoki Co., Ltd. (L/D=36, cylinder diameter of 90 mm). The cylinder temperature was set to 180° C. in the first half period and to 250° C. in the latter half period, and the revolution of the screw was 133 rpm.

The MFR (measured at 230° C. under a load of 21.2 N) of the obtained modified polypropylene (C-1) was 70 g/10 min, the amount of the grafted maleic anhydride was 0.6 wt %, and the graft ratio was 0.8.
<Polypropylene Resin (D-1)>

A propylene homopolymer (Nobrene of Sumitomo Chemical Co., Ltd., grade: U5101E1, MFR (measured at 230° C. under a load of 21.2 N) of 120 g/10 min, isotactic pentad fraction of 0.98) was used as the polypropylene resin (D-1).
<Polypropylene Resin (D-2)>

A mixture of a propylene homopolymer and an ethylene-propylene copolymer, obtained by copolymerizing ethylene with propylene after propylene is homopolymerized (Nobrene of Sumitomo Chemical Co., Ltd., grade: WPX5343, MFR (measured at 230° C. under a load of 21.2 N) of 50 g/10 min, ethylene-propylene copolymer content of 13 wt %, ethylene content of the copolymer of 36 wt %, isotactic pentad fraction of 0.98) was used as the polypropylene resin (D-2).
<Polypropylene Resin (D-3)>

A mixture of a propylene homopolymer and an ethylene-propylene copolymer, obtained by copolymerizing ethylene with propylene after propylene is homopolymerized (Nobrene of Sumitomo Chemical Co., Ltd., grade: AU161C, MFR (measured at 230° C. under a load of 21.2 N) of 90 g/10 min, ethylene-propylene copolymer content of 11 wt %, isotactic pentad fraction of 0.97) was used as the polypropylene resin (D-3).
<Polypropylene Resin (D-4)>

A mixture of a propylene homopolymer and an ethylene-propylene copolymer, obtained by copolymerizing ethylene with propylene after propylene is homopolymerized (Nobrene of Sumitomo Chemical Co., Ltd., grade: AZ864, MFR (measured at 230° C. under a load of 21.2 N) of 33 g/10 min, ethylene-propylene copolymer content of 21 wt %, ethylene content of the copolymer of 34 wt %, isotactic pentad fraction of 0.98) was used as the polypropylene resin (D-4).

Examples 1 to 9

Fiber-containing pellets having a pellet length of 11 mm and composition shown in Table 1 were produced. That is, after a surface-treated fiber (component A) was impregnated with a resin component supplied from an extruder connected to a cross head die having a wavy passage while it was pulled through the cross head die, it was taken up as a strand through a forming die and cut into a fiber-containing pellet. The impregnation temperature was 200° C., and the take-up speed was 13 m/min.

The fiber-containing pellet was injection molded to obtain an evaluation sample so as to evaluate its surface impact strength, specific gravity and residual weight average fiber length. The results are shown in Table 1.

Comparative Example 1

A resin composition having the same composition as in Example 3 was produced except that the surface-treated fiber (A-3) was used in place of the surface-treated fiber (A-1). The results are shown in Table 2.

Comparative Example 2

A resin composition having the same composition as in Example 2 was produced except that the surface-treated fiber (A-3) was used in place of the surface-treated fiber (A-1). The results are shown in Table 2.

Comparative Example 3

A resin composition having composition shown in Table 2 was produced without using the ethylene-based copolymer (B-1). The results are shown in Table 2.

Comparative Examples 4 and 5

Resin compositions having composition shown in Table 2 were produced by using the polypropylene resin (D-4). The results are shown in Table 2.

TABLE 1

|  |  |  |  | Ex. 1 | Ex. 2 | Ex. 3 | Ex. 4 | Ex. 5 |
|---|---|---|---|---|---|---|---|---|
| Mixture | Component A | Sizing agent | Type | (a) | (a) | (a) | (a) | (a) |
|  |  |  | Glass transition temperature (° C.) | 7 | 7 | 7 | 7 | 7 |
|  |  | Fiber | Type | PEN fiber | PEN fiber | PEN fiber | PEN fiber | PEN fiber |
|  |  |  | Filament diameter (μm) | 33 | 33 | 33 | 33 | 33 |
|  |  | Surface-treated fiber | Type | A-1 | A-1 | A-1 | A-1 | A-1 |
|  |  |  | Amount (parts by weight) | 100 | 100 | 100 | 100 | 100 |
|  | Component B | Ethylene-based copolymer | Type of resin | B-1 | B-1 | B-1 | B-1 | B-1 |
|  |  |  | Amount (parts by weight) | 6.07 | 23.3 | 23.3 | 0.933 | 0.467 |
|  | Component C | Modified polypropylene | Type of resin | C-1 | C-1 | C-1 | C-1 | C-1 |
|  |  |  | Amount (parts by weight) | 5.60 | 46.7 | 46.7 | 10.7 | 11.2 |
|  | $Cx \cdot Cy / Bx \cdot By$ |  | Modification rate (—) | 0.029 | 0.063 | 0.063 | 0.36 | 0.76 |
|  | Component D | Polypropylene resin | Type of resin | D-3 | D-2 | D-1 | D-3 | D-3 |
|  |  |  | Amount (parts by weight) | 222 | 163 | 163 | 222 | 222 |
| Evaluation |  | Surface impact strength (J) |  | 21.6 | 22.6 | 21.3 | 21.5 | 21.2 |
|  |  | Specific gravity (—) |  | 1.01 | 1.02 | 1.02 | 1.01 | 1.01 |
|  |  | Residual weight average fiber length (mm) |  | >8 | >8 | >8 | >8 | >8 |

|  |  |  |  | Ex. 6 | Ex. 7 | Ex. 8 | Ex. 9 |
|---|---|---|---|---|---|---|---|
| Mixture | Component A | Sizing agent | Type | (a) | (b) | (b) | (b) |
|  |  |  | Glass transition temperature (° C.) | 7 | 61 | 61 | 61 |
|  |  | Fiber | Type | PEN fiber | PEN fiber | PEN fiber | PEN fiber |
|  |  |  | Filament diameter (μm) | 33 | 33 | 33 | 33 |
|  |  | Surface-treated fiber | Type | A-1 | A-2 | A-2 | A-2 |
|  |  |  | Amount (parts by weight) | 100 | 100 | 100 | 100 |
|  | Component B | Ethylene-based copolymer | Type of resin | B-1 | B-1 | B-1 | B-1 |
|  |  |  | Amount (parts by weight) | 0.117 | 23.3 | 23.3 | 46.7 |
|  | Component C | Modified polypropylene | Type of resin | C-1 | C-1 | C-1 | C-1 |
|  |  |  | Amount (parts by weight) | 11.6 | 46.7 | 46.7 | 23.3 |
|  | $Cx \cdot Cy / Bx \cdot By$ |  | Modification rate (—) | 3.1 | 0.063 | 0.063 | 0.016 |
|  | Component D | Polypropylene resin | Type of resin | D-3 | D-2 | D-1 | D-1 |
|  |  |  | Amount (parts by weight) | 222 | 163 | 163 | 163 |
| Evaluation |  | Surface impact strength (J) |  | 20.3 | 21.9 | 21.1 | 20.5 |
|  |  | Specific gravity (—) |  | 1 | 1.02 | 1.02 | 1.03 |
|  |  | Residual weight average fiber length (mm) |  | >8 | >8 | >8 | >8 |

Ex.: Example

TABLE 2

| | | | | C. Ex. 1 | C. Ex. 2 | C. Ex. 3 | C. Ex. 4 | C. Ex. 5 |
|---|---|---|---|---|---|---|---|---|
| Mixture | Component A | Sizing agent | Type | (c) | (c) | (b) | (b) | (b) |
| | | | Glass transition temperature (° C.) | Undetectable | Undetectable | 61 | 61 | 61 |
| | | Fiber | Type | PEN fiber | PEN fiber | PEN fiber | PEN fiber | PEN fiber |
| | | | Filament diameter (μm) | 33 | 33 | 33 | 33 | 33 |
| | | Surface-treated fiber | Type | A-3 | A-3 | A-2 | A-2 | A-2 |
| | | | Amount (parts by weight) | 100 | 100 | 100 | 100 | 100 |
| | Component B | Ethylene-based copolymer | Type of resin | B-1 | B-1 | — | B-1 | B-1 |
| | | | Amount (parts by weight) | 23.3 | 23.3 | — | 46.7 | 23.3 |
| | Component C | Modified polypropylene | Type of resin | C-1 | C-1 | C-1 | C-1 | C-1 |
| | | | Amount (parts by weight) | 46.7 | 46.7 | 23.3 | 23.3 | 46.7 |
| | Cx · Cy/Bx · By | | Modification rate (—) | 0.063 | 0.063 | — | 0.016 | 0.063 |
| | Component D | Polypropylene resin | Type of resin | D-1 | D-2 | D-1 | D-4 | D-4 |
| | | | Amount (parts by weight) | 163 | 163 | 210 | 163 | 163 |
| Evaluation | | Surface impact strength (J) | | 20.2 | 19.8 | 18.8 | 18.5 | 19.9 |
| | | Specific gravity (—) | | 1.02 | 1.01 | 1.00 | 1.01 | 1.01 |
| | | Residual weight average fiber length (mm) | | >8 | >8 | >8 | >8 | >8 |

C. Ex.: Comparative Example

EFFECT OF THE INVENTION

A molded article which has a low specific gravity and is lightweight and excellent in impact resistance is obtained from the resin composition of the present invention.

INDUSTRIAL FEASIBILITY

The resin composition and molded article of the present invention can be used in car parts.

What is claimed is:

1. A resin composition comprising a fiber component and a resin component, wherein
the fiber component is (A) a surface-treated fiber (component A) which comprises 100 parts by weight of a fiber comprising a polyalkylene terephthalate and/or a polyalkylene naphthalene dicarboxylate (component Af) and 0.1 to 10 parts by weight of a sizing agent (component Ac) having a glass transition point of −80° C. or higher and lower than 70° C. and adhered to the surface of the fiber; and
the resin component comprises
(B) an ethylene-based copolymer containing a glycidyl group (component B),
(C) a modified polyolefin resin modified with an unsaturated carboxylic acid and/or an unsaturated carboxylic acid derivative (component C), and
(D) a polyolefin resin having a melt flow rate of 40 to 200 g/10 min (component D), except for the components B and C,
the content of the component D being 30 to 850 parts by weight based on 100 parts by weight of the component A, and the total content of the components B and C being 5 to 630 parts by weight based on 100 parts by weight of the component A,
wherein the components B and C satisfy the following expression:

$$0.02 \leq Cx \cdot Cy/Bx \cdot By \leq 3.0$$

Bx: content (wt %) of component B
By: content (wt %) of monomer unit having a glycidyl group in component B
Cx: content (wt %) of component C
Cy: content (wt %) of monomer unit derived from unsaturated carboxylic acid and/or unsaturated carboxylic acid derivative in component C.

2. The resin composition according to claim 1, wherein the component Ac is a polyurethane resin.

3. The resin composition according to claim 1, wherein the component Af has a weight average fiber length of 2 to 50 mm.

4. The resin composition according to claim 1, which has a pellet shape.

5. A molded article molded from the resin composition of claim 1.

6. The molded article according to claim 5, which is selected from a car interior part, a car exterior part and an engine room part.

* * * * *